United States Patent [19]

Dorr

[11] Patent Number: 5,303,208

[45] Date of Patent: Apr. 12, 1994

[54] SIDE LOOKING SONAR TRANSDUCER

[75] Inventor: John A. Dorr, Baltimore, Md.

[73] Assignee: Westinghouse Electric Corp., Pittsburgh, Pa.

[21] Appl. No.: 889,415

[22] Filed: Dec. 31, 1969

[51] Int. Cl.$^5$ .............................................. H04R 17/00
[52] U.S. Cl. ...................................... 367/153; 367/88; 367/154
[58] Field of Search ..................... 340/9; 367/153-156, 367/88

[56] References Cited

U.S. PATENT DOCUMENTS

| | | | |
|---|---|---|---|
| 2,864,592 | 12/1958 | Camp | 340/90 X |
| 3,359,537 | 12/1967 | Gel et al. | 340/9 X |
| 3,474,402 | 10/1969 | Cook et al. | 340/9 |

Primary Examiner—Harold J. Tudor
Attorney, Agent, or Firm—D. Schron

[57] ABSTRACT

A side looking sonar transducer having a plurality of active elements forming an elongated active radiating, or receiving surface wherein the active elements at the ends of the transducer have a lesser depression angle than the active elements at the middle. This arrangement provides an energy distribution which allows for a greater depth of focus.

4 Claims, 11 Drawing Sheets

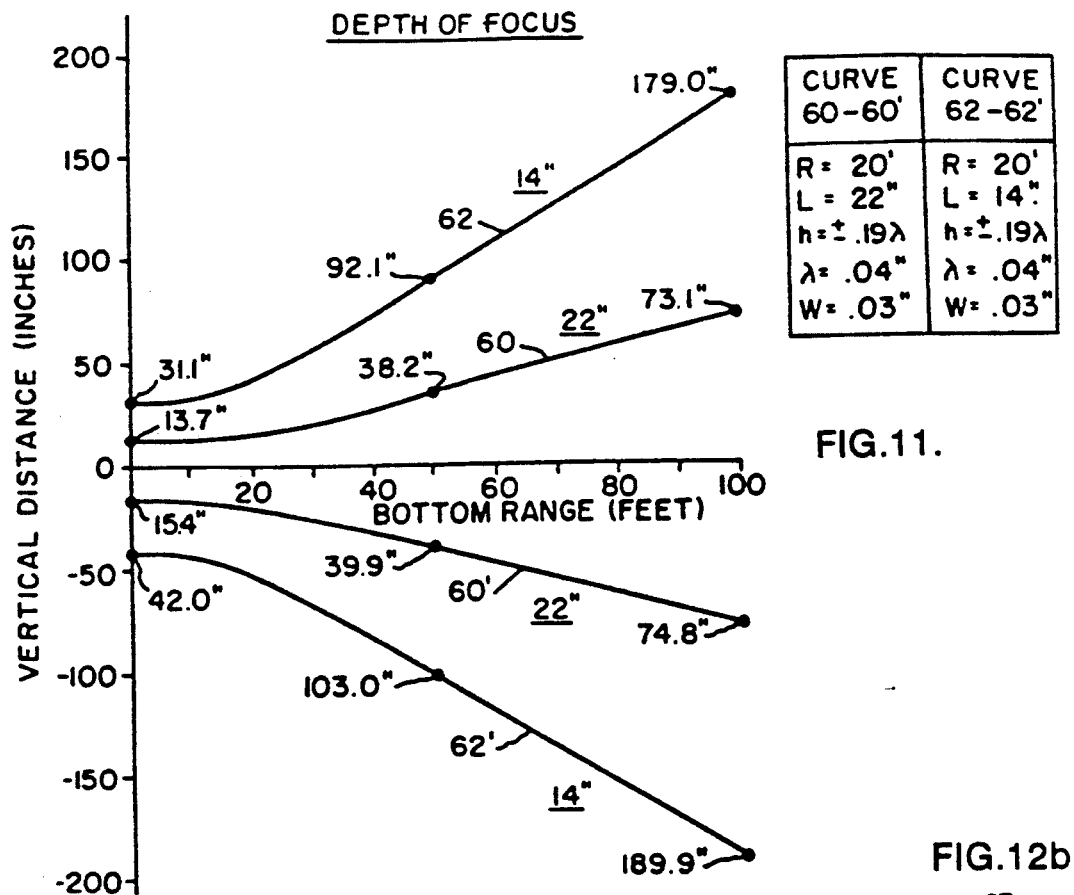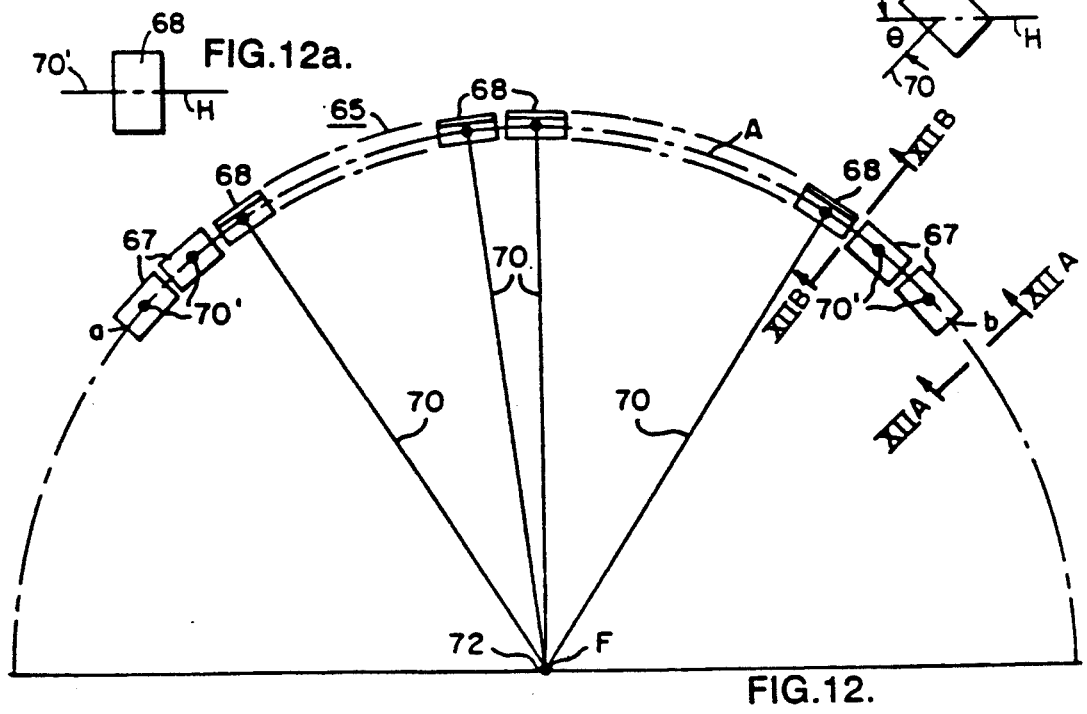

SIDE LOOKING SONAR TRANSDUCER

CROSS REFERENCE TO RELATED APPLICATIONS

Ser. No. 840,163 filed Jul. 9, 1969 now U.S. Pat. No. 3,585,579

BACKGROUND OF THE INVENTION

1. Field of the Invention

The invention in general relates to transducers, and particularly to a side looking sonar transducer which transmits acoustic energy to, or receives reflected acoustic energy from, a narrow strip on a target area such as the sea bottom.

2. Description of the Prior Art

In side looking sonar systems an elongated transducer is generally mounted on a carrier vehicle which travels either on or below the water surface along a course line. Acoustic energy is propagated in a very narrow fan shaped beam pattern toward a target area, the sea bottom, by the transducer and energy reflected from the bottom or objects on the bottom is picked up by a similar receiver transducer. As the carrier vehicle continues along its course line an indicating apparatus such as a storage tube or paper recorder, portrays a picture of the bottom in accordance with each reflected transmitted signal. The resultant display is similar to a picture on a television screen in that the entire picture is made up of a plurality of parallel sweeps with each sweep being the portrayal of a reflected transmitted signal.

One type of side looking sonar transducer has been developed wherein the transducer is of a curved elongated configuration and the carrier vehicle travels at a relatively low altitude above the bottom, for example twenty feet.

The curved transducer has a radiating surface arranged on the arc of a circle whose radius is the design altitude and acoustic energy is focussed along a line of focus on the sea bottom. The curvature of the arc approximately matches the wave front curvature of the reflected acoustic energy and any variation in the design altitude results in defocussing and a consequent degradation of the display.

It is therefore an object of the present invention to provide a focussed side looking sonar transducer that provides for a greater depth of focus than transducers of the prior art.

Another type of side looking sonar transducer is the straight line configuration. This type is not focussed along a line of focus and can tolerate relatively large altitude excursions. The resolution of the desired target area relatively close to the transducer is however limited by the width of the transducer.

It is a further object to provide a straight line side looking sonar transducer that effectively increases the depth of field of the display, that is, increases the resolution for target areas relatively close to the transducer.

SUMMARY OF THE INVENTION

A side looking sonar transducer means is provided and includes a plurality of active elements arranged in end to end relationship along a line to form an elongated active surface with the depression angle of active elements being less toward one, and preferably both ends of the transducer. The transducer may be used as a transmitter and/or a receiver of acoustic energy and the variable depression angle active surface results in a transducer having an effective length L for governing response at relatively large distances from the transducer and an effective length L', of a magnitude smaller than L, for governing response relatively close to the transducer. The apparent shortening of the transducer results in a greater depth of focus or depth of field at those positions relatively close to the transducer.

BRIEF DESCRIPTION OF THE DRAWINGS

FIG. 11 shows curves illustrating the variation in depth of focus with increase in bottom range;

FIG. 12 illustrates a preferred embodiment of the present invention;

FIG. 12a illustrates a view along line XIIA—XIIA of FIG. 12;

FIG. 12b illustrates a view along line XIIB—XIIB of FIG. 12;

DESCRIPTION OF THE PREFERRED EMBODIMENT

Figure 1A:
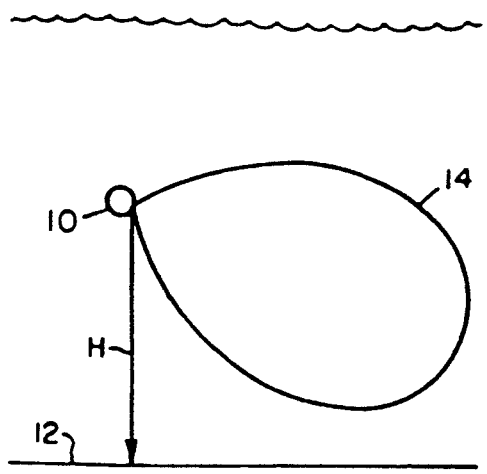
FIGS. 1a and 1b show an elevational and a plan view, respectively, of a typical side looking sonar beam pattern.
Figure 1B:
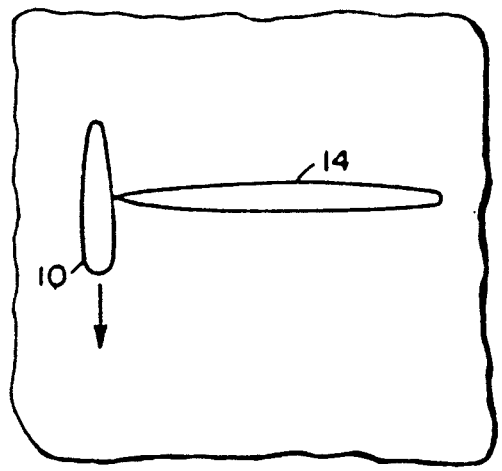

In FIG. 1a, illustrating a typical side looking sonar application, a carrier 10 proceeds along a course line (toward the viewer) at a predetermined altitude H above the sea bottom 12. Although sea bottom is mentioned it is obvious that the apparatus may be used over different target areas and in various bodies of water. Side looking sonar apparatus aboard the carrier 10 has associated therewith a pancake shaped beam pattern 14 being wide in a generally vertical plane and being relatively narrow in a generally horizontal plane, as illustrated in FIG. 1b which is a view looking down on the apparatus of FIG. 1a.

For increased coverage of the target area, port and starboard transducer means may be provided and may simultaneously operate at slightly different frequencies of operation or may operate sequentially at the same frequency.

The transducer which provides such a beam pattern has a radiating or active surface which is very long compared to its width. For example, in terms of wavelength, $\lambda$, its length L may be over 150 $\lambda$ and its width W, less than 1 $\lambda$ where $\lambda$ is the wavelength of the operating frequency, in the fluid medium in which the transducer operates.

Figure 2:
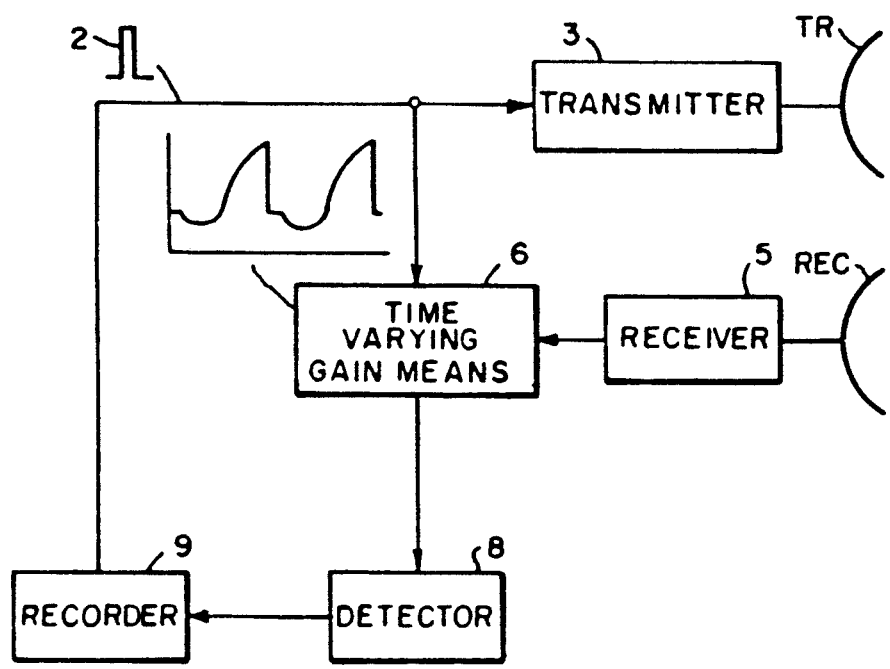
FIG. 2 is a block diagram of the transmit/receive electronics portion of a typical side looking sonar system.

FIG. 2 illustrates in block diagram form an operative side looking sonar system for one side. Where very low speed can be tolerated, a single transducer may be used in conjunction with proper switching equipment as both a transmitter and a receiver of acoustic energy. For a relatively faster speed however two transducers are utilized, one for projecting acoustic energy and one for receipt of reflected acoustic energy, with the transducers being oriented relative to one another that the transmitted acoustic energy is projected at an angle with respect to the receiver. In FIG. 2, upon the application of a suitable command pulse 2, the transmitter 3 will provide an electrical signal to the transmitter transducer TR. Reflected acoustic energy is received by the receiver transducer REC the output signal of which is provided to a receiver means 5. In order to provide for somewhat uniform intensity of the return signal (in the absence of a target) the receiver output, which decreases in amplitude with respect to time, is operated upon by time varying gain means 6 which varies gain in accordance with the illustrated curve. Such technique is well known to those skilled in the art. The detector 8, which receives the output of the time varying gain means 6, provides an output signal to recorder means 9 which then provides the desired display. Such recorder means 9 may be for example magnetic tape storage for future display, cathode ray storage tube apparatus, or a helical wire-electro-sensitive paper unit, to name a few.

Figure 3:
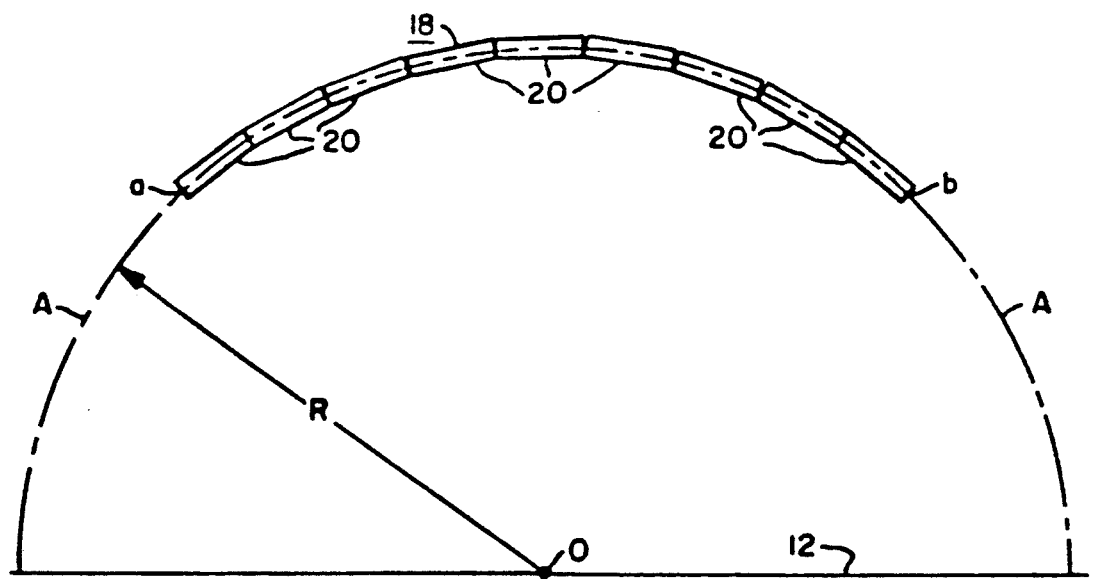
FIG. 3 illustrates a side looking sonar transducer of the prior art.

For high resolution work, use is made of a curved transducer such as illustrated in FIG. 3 to which reference is now made.

The transducer 18, representative of the prior art, is made up of a plurality of active elements 20 arranged in end-to-end relationship such that the center of each element 20 lies substantially along the curve A, A being a section of a circle having the center O and a radius R. Each element 20 (more particularly the center of each rectangular surface illustrated) is at the same distance R from point O. If the transducer 18 is designed to travel at an altitude H equal to the distance R, then point O will lie on the sea bottom 12 and the energy radiated at any instant of time from any of the active elements 20 will arrive at point O simultaneously with the arrival of the energy transmitted by the remaining active elements. Conversely, if transducer 18 is a receiver, energy transmitted, or reflected, from point O and radiating spherically, will simultaneously arrive at each of the active elements 20. If O is extended perpendicularly to the plane of the circle then each of the active elements 20 will be equally distant from any point on that line. This is illustrated in FIG. 4.

Figure 4:
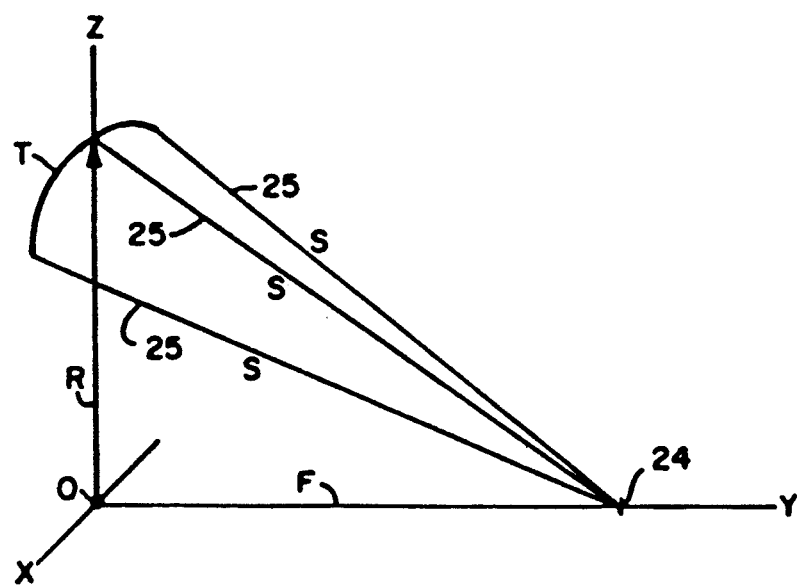
FIG. 4 illustrates the positional orientation of the transducer of FIG. 3.

FIG. 4 illustrates an XYZ coordinate system with the transducer 18 of FIG. 3 being represented by T which is the curve A between points a and b. T lies in the XZ plane at an altitude or distance R from the origin O and each point on T is at the same distance R from O since T is the arc of the circle centered about O. Line F, known as the line of focus is perpendicular to the plane of the circle at point O and any point on line F is equidistant to all points on the transducer T. A line from point 24 drawn to the intersection of the transducer T and the Z axis is designated 25 and has a length s, s being the slant range to point 24. The lines 25 joining the end points of the transducer with point 24 are also of a distance equal to s. Lines joining point 24 with each and every point on the transducer T would form a section of a cone.

Figure 5:
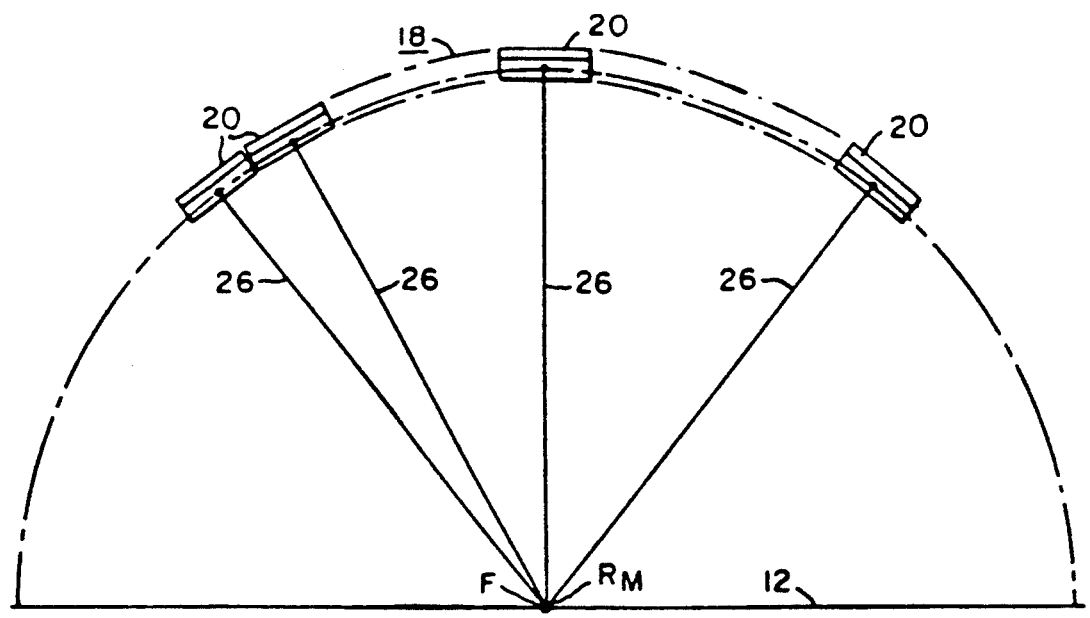
FIG. 5 illustrates another transducer of the prior art.

Perpendiculars drawn to the faces of the active elements in FIG. 3 will all be parallel to one another and to the Y axis in FIG. 4. Maximum energy is directed or received along that perpendicular. In order to direct more energy onto the sea bottom the individual active elements are generally tilted about the arc A by a certain depression angle, as illustrated in FIG. 5, such that the perpendicular to each face passes through a point on the line of focus F, such point $R_m$ being at maximum range. For example, and with additional reference to FIG. 4, if point 24 is the maximum range point $R_m$ then the lines 25 will be identical with the lines 26.

Figure 6:
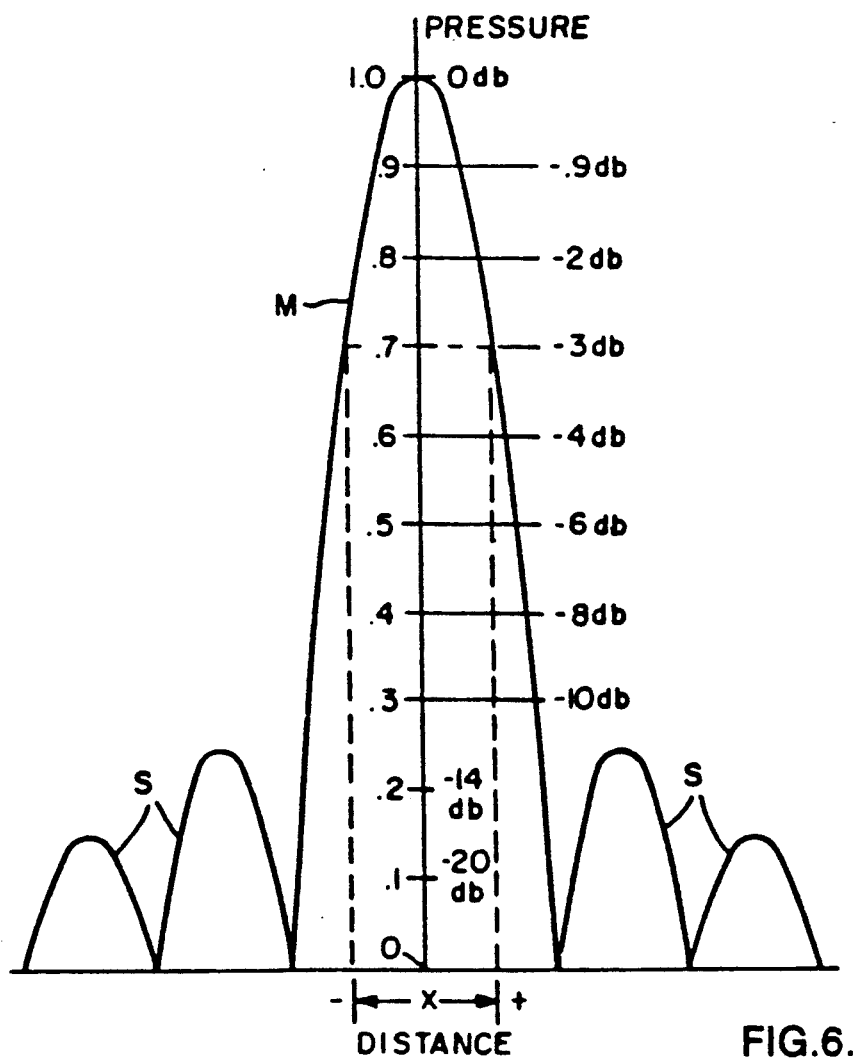
FIG. 6 is a beam pattern in rectangular coordinates.

The transducer 18 whether it is a transmitter or receiver of acoustic energy has a radiation pattern or receive pattern, respectively, associated therewith. FIG. 6 illustrates in rectangular coordinates, a typical beam pattern on the sea bottom. In FIG. 6 the horizontal axis represents units of distance from an origin O, O for example being any representative point on the line of focus F. The vertical axis represents normalized acoustic sound pressure. That is, the maximum acoustic sound pressure (at the particular point in question) has been given an arbitrary value of 1 with all sound pressures being relative to the maximum and therefore falling between 0 and 1. The vertical scale of FIG. 6 has also been labeled in decibels (db). This designation is another manner of stating relative pressures and since the pressure will be a maximum of 1 or less, the pressure designation will be —db or "db down". For example, the maximum point, 1.0 on the relative pressure scale would be equivalent to 0 db; a pressure of approximately 0.7 of maximum is said to be —3 db or 3 db down; and a pressure of approximately 0.1 is said to be —20 db or 20 db down. The db values are approximate and may be calculated exactly from known formulas. The width of the beam which includes a main lobe M and a plurality of side lobes S, is generally given at some reference level. By way of example, the —3 db points of the main lobe may be chosen as the reference, as is commonly done, and the width of the beam represented by the pattern of FIG. 6 therefore will be equal to x units of distance.

Figure 7:
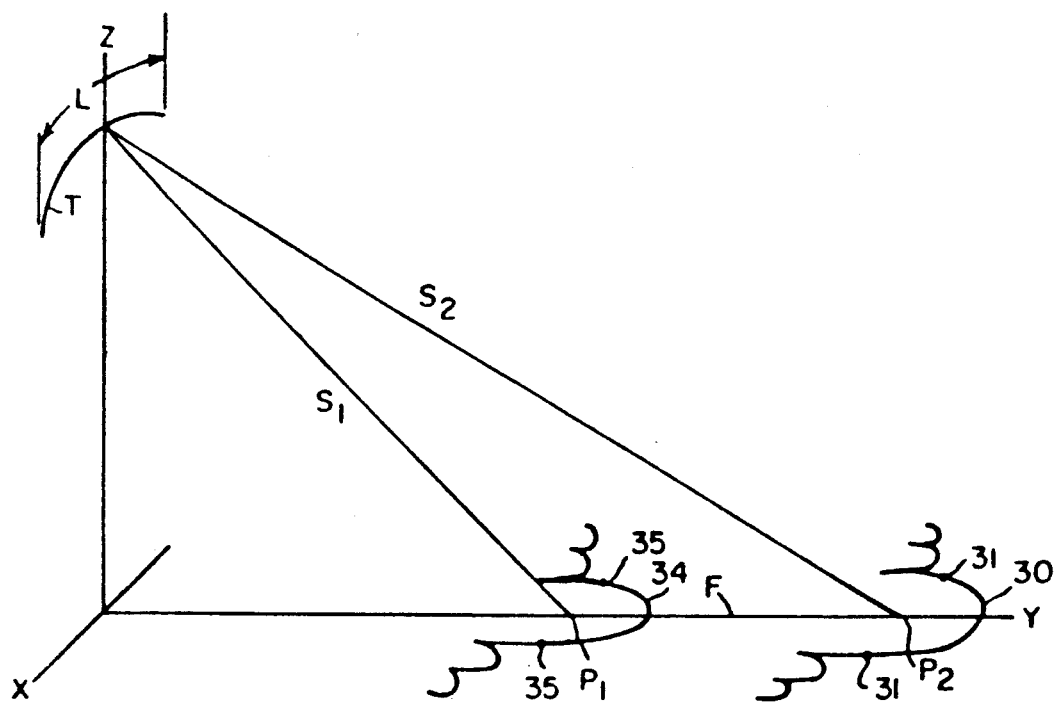
FIG. 7 illustrates the development of a beam pattern on a target area for a transducer such as illustrated in FIG. 5.

Each point along the line of focus F has a beam pattern such as illustrated in FIG. 6. In FIG. 7 the beam pattern 30 is the pattern associated with point $P_2$ at a slant range of $S_2$ from the transducer T. The —3 db points are designated 31. Another beam pattern 34 is illustrated for point $P_1$ at a slant range of $S_1$ from transducer T and the —3 db points are designated 35. The distance between the —3 db points (x in FIG. 6) may be approximated by the relationship $$x = \frac{.89\lambda}{L} S \qquad \text{Eq. (1)}$$

where $\lambda$ is the wavelength of the operating frequency, L the length of the transducer T, and S the slant range.

Figure 8:
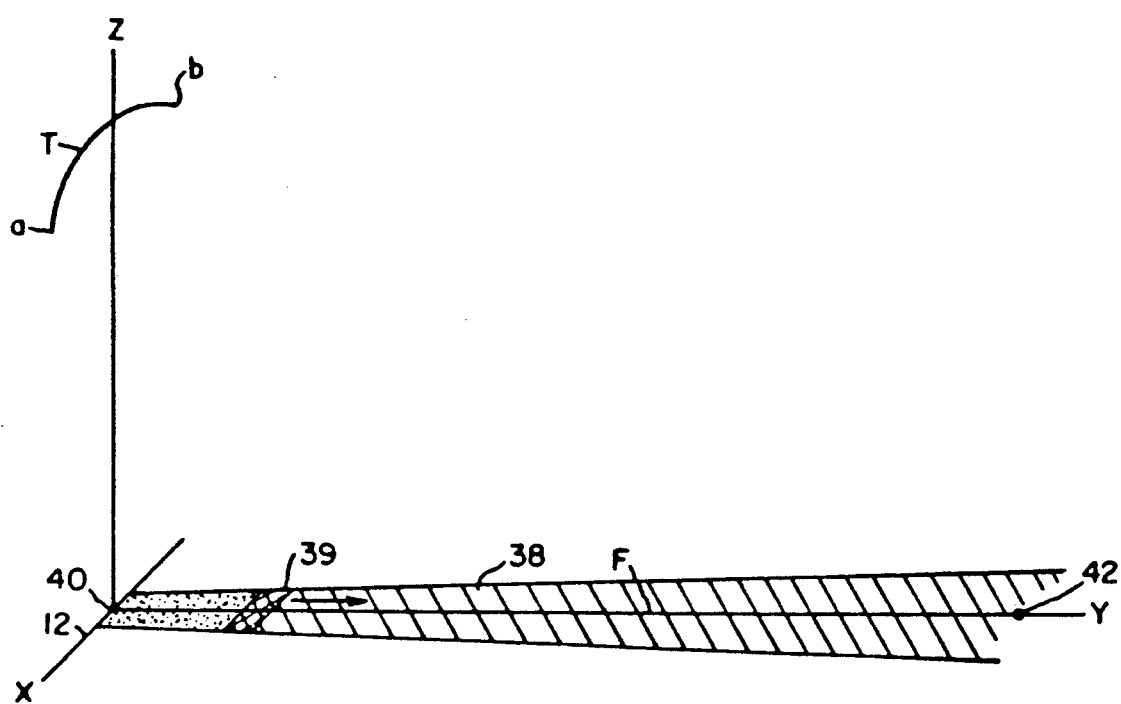
FIG. 8 shows an insonified area, or a receive area for a typical side looking sonar transducer.

From the relationship it may be seen that as the slant range S increases, the distance x between the −3 db points also increases. It is obvious that the beam pattern could be drawn for every point along the line of focus F. If a line is drawn through all the −3 db points on one side of the line of focus F and through all the −3 db points on the other side of F then there is defined a wedge shaped area 38 as illustrated in FIG. 8. The area 38, sometimes known as the insonified area, is the area which contains maximum acoustic energy. Conversely if the transducer T is a receiver then it will receive substantially the energy reflected from the area, or any target in the area, 38 and will provide a corresponding output signal in response to receipt of such energy. In actual operation transducer T provides an acoustic pulse 39 which initially impinges upon the sea bottom (the XY plane) for example at point 40 and proceeds outwardly along the line of focus F to a maximum point 42, to thereby define the area 38.

Consider now a situation wherein FIG. 8 represents a receive situation and transducer T is a receiver transducer. Reflected acoustic energy from the area 38 or from a target within the area 38 diverges substantially omnidirectionally. That is, a reflected wave front may be thought of as an expanding sphere emanating from the point of reflection. When reflected energy from area 38 reaches the transducer T the wavefront of such energy will substantially match the curvature of transducer T which accordingly will provide a corresponding output signal.

The transducer is designed for a critical altitude and deviation from altitude will place the line of focus F above or below the XY plane.

Even if the critical altitude is maintained it will be apparent that reflected energy may emanate from a point above or below the area 38 due to a reflection from a physical target or land contour. It may be shown that for relatively distant ranges, for example, near the vicinity of point 42, the wavefront of energy reflected from a point above or below the line of focus F by a considerable distance will still match the curvature of transducer T to such an extent as to provide a meaningful output signal. However, considering a relatively close in range in the vicinity of point 40, as soon as the reflecting point goes above or below the line of focus F by a relatively small amount, a proper signal indicative of that target point will not be provided. This defocussing effect is further illustrated in FIGS. 9a, b and c.

Figure 9B:
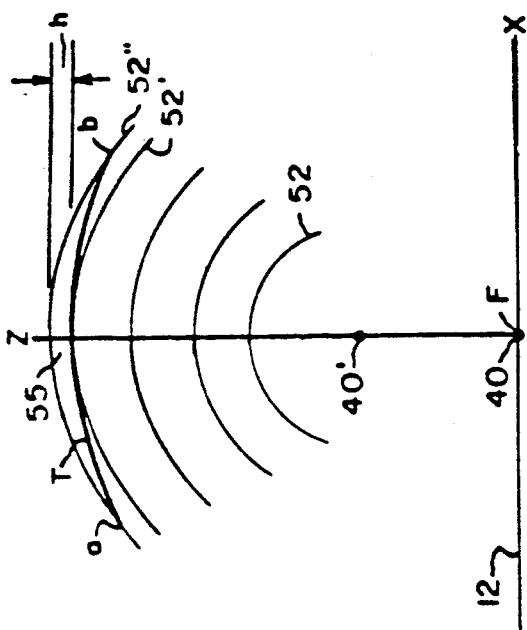
FIGS. 9a through 9c serve to illustrate the matching and mis-matching of acoustic energy with the curved transducer to aid in understanding of depth of focus of the transducer.
Figure 9A:
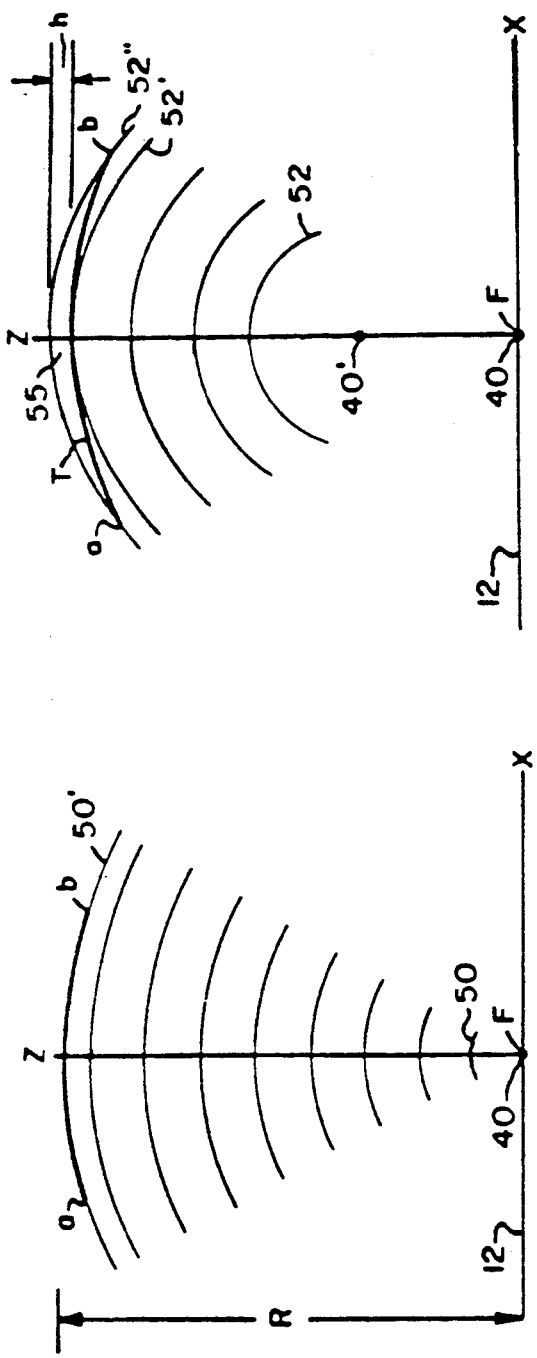

FIG. 9a is a view looking down the line of focus F toward the XZ plane and illustrates acoustic energy reflected from point 40. FIG. 9a represents a particular wavefront 50 as it emanates from point 40 toward the transducer T. It is seen that wavefront 50 after having traveled for a distance R will exactly match the curvature of transducer T, every section of which will provide an output signal in accordance with the wavefront and in phase with every other section of the transducer T.

In FIG. 9b the situation is depicted wherein acoustic energy is reflected from point 40' above the line of focus F. Wavefront 52 proceeds from point 40' and at some later time just touches transducer T and is designated 52'. As the wavefront proceeds it will touch the ends a and b of transducer T and a crescent 55 will be formed between the wavefront, designated 52", and the transducer T. If the height h of this crescent is more than a predetermined value then it may be stated that a proper output signal will not be provided. Depending upon system design and by way of example, if h is greater than 0.38 λ then the output signal will be degraded such that point 40' will not be properly displayed on the recorder apparatus. For radiations effectively emanating from point 40" the crescent area would be below the line T and if the height of such crescent was greater than the critical distance h, a meaningful output signal would not be provided.

Figure 9C:
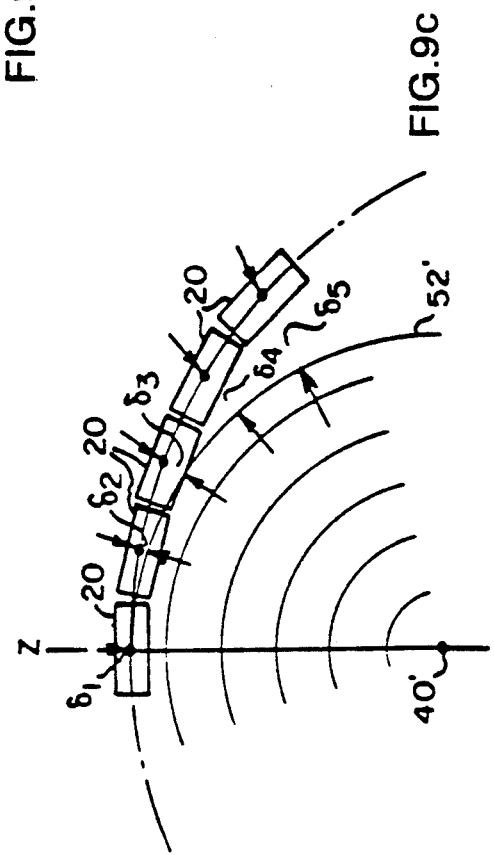

The reason for signal degradation is graphically depicted in FIG. 9c which shows several active elements 20 of the transducer T in conjunction with the wave front 52' of FIG. 9b. A dot has been drawn at the center of the active face of each element 20 to serve as a reference point and it is seen that when the wavefront 52' just touches the dot of the active element 20 on the Z axis it will be at a progressively increasing distance from the remaining active elements.

In the Figure $\delta_1 = 0$ and $\delta_2 < \delta_3 < \delta_4 < \delta_5$. Each active element therefore contributes an individual signal which is out of phase with the signals provided by the remaining active elements. The signals are provided by suitable electrode means, not shown, but well known to those skilled in the art. A vector addition of these individual signals provides a resultant signal of a substantially reduced magnitude. In contrast, a wavefront proceeding from point 40 would simultaneously impinge on each active element 20 and the individual output signals, all being in phase, would result in a significantly higher output signal.

If the height h of the crescent 55 formed by the wavefront of energy emanating from point 40' could be reduced below the critical value, the information relative to point 40' could also be properly displayed.

Figure 10:
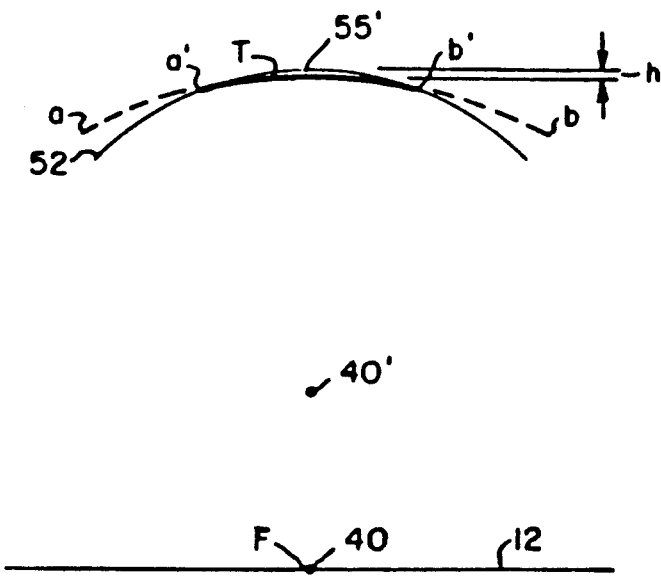
FIG. 10 illustrates the effect of shortening the transducer of FIGS. 9a through 9c.

As illustrated in FIG. 10, if the length of the transducer T is shortened from points a and b to points a' and b' respectively then the wavefront 52 emanating from point 40' forms a crescent 55' of a height h which is significantly reduced in magnitude such that information relative to point 40' may now be displayed.

It may be shown that for bottom ranges from directly beneath the transducer out to maximum range, the depth of focus varies inversely as the square of the length of the transducer. For bottom ranges approximately equal to or less than the magnitude of altitude R, the depth of focus is approximately proportional to $$\frac{R^2}{L^2}.$$

For greater bottom ranges the depth of focus is approximately proportional to $$\frac{R}{L^2}.$$

Variation in depth of focus is illustrated in FIG. 11 wherein the horizontal axis represents the bottom range, in feet, along the line of focus, and the vertical axis represents vertical distance, in inches. Curve 60 represents the depth of focus above, and curve 60' the depth of focus below the line of focus, for a transducer such as in FIG. 9b with the following design parameters given by way of example;

| | |
|---|---|
| operating altitude R | 20 feet |
| Length L | 22 inches |
| λ | 0.04 inches |

| | |
|---|---|
| width W of active surface | 0.03 inches (3/4 λ) |
| critical distance h | 0.38 λ |

Curve 60 shows that directly below the transducer, that is at a bottom range of zero on the horizontal scale the depth of focus is +13.7 inches and curve 60' shows a depth of focus of −15.4 inches. A similar transducer reduced in length to, for example, 14 inches would have a depth of focus, at that same bottom range of zero, of +31.1 inches and −42.0 inches. The positive and negative depth of focus for such 14 inch transducer is depicted in curve 62 and 62' respectively.

Past approximately 20 feet, curve 60 and 60' diverge so that at a bottom range of for example 100 feet the depth of focus would be +73.1 inches and −74.8 inches. For the 14 inch transducer these respective values are extended to +179.0 inches and −189.9 inches respectively. From the curves of FIG. 11 it is seen that for distant ranges a relatively large transducer altitude deviation may be tolerated. For close in ranges the maintenance of a specified relative altitude is critical although it is seen that it is less critical for a shorter transducer than for a longer transducer. Use of a shorter transducer therefore would allow for a greater depth of focus however, from equation (1) the width x of the insonified area at maximum range would also be increased, thus degrading system resolution. The situation is presented therefore where it is desired to have a relatively long transducer for maintaining system resolution while at the same time a relatively shorter transducer is desired for increasing the depth of focus for close in ranges. The present invention provides for an increased depth of focus at close in ranges without sacrificing system resolution. This is accomplished by an elongated transducer means having a plurality of active elements such as illustrated in FIG. 5 but wherein the depression angles of some of the elements are different from the depression angle of the remaining elements, with the depression angles of the elements toward the ends of the transducer being less than the depression angles of the elements toward the center of the transducer.

FIG. 12 illustrates one embodiment of the present invention and for ease of explanation and understanding, only two different depression angles are illustrated with the depression angle of two end elements 67 on one side and two end elements 67 on the other side of transducer 65 being equal to zero. The depression angles of the remaining central elements 68 may all be equal. With such arrangement, the perpendicular 70 drawn to the active face of each element 68 all touch the line of focus F at point 72. Each perpendicular 70' drawn to the active surface of elements 67 is parallel to the line of focus F and consequently are illustrated as points.

FIG. 12a is a view along line XIIA—XIIA, of the end element 67 and FIG. 12b is a view along line XIIB—XIIB of element 68. In FIG. 12a, the perpendicular 70' is coincident with a horizontal line H whereas in FIG. 12b it is seen that the element has been given a certain depression angle such that its perpendicular 70 is at an angle $\theta$ with respect to a horizontal line H.

Figure 13:
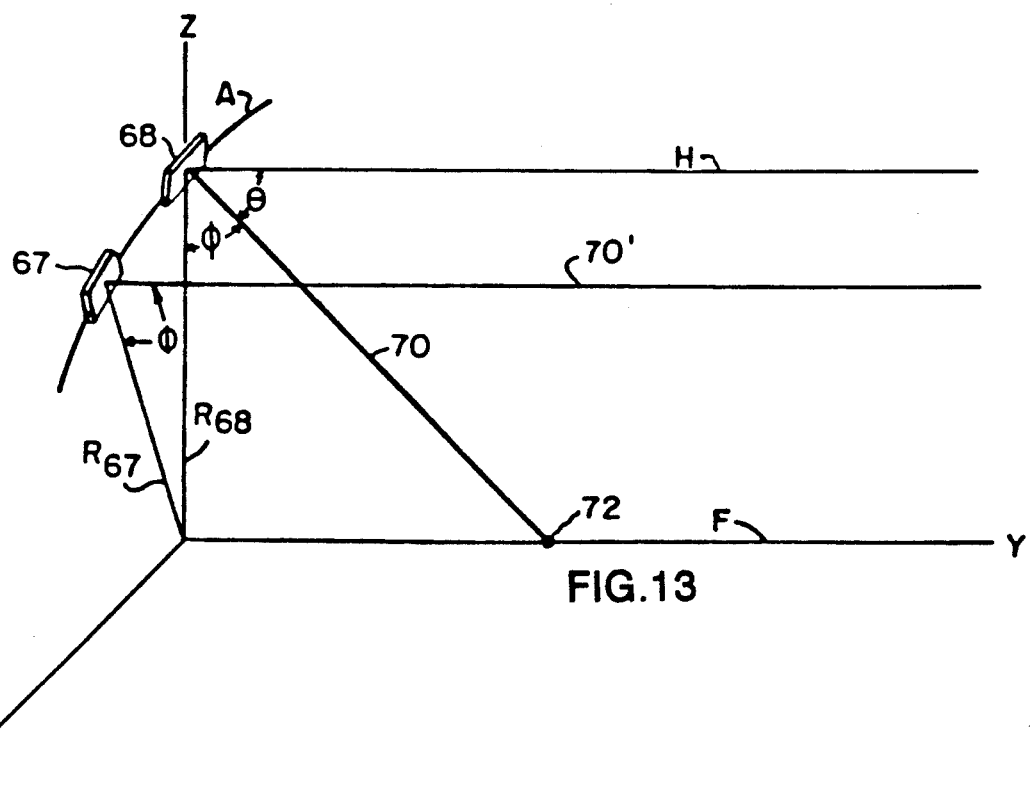
FIG. 13 illustrates two active elements of FIG. 12 and their orientation in an XYZ coordinate system.

FIG. 13 further illustrates the arrangement of FIG. 12 in an XYZ coordinate orientation with only two of the elements 67 and 68 being illustrated. Element 68 has been given a depression angle $\theta$ such that its perpendicular 70 touches the line of focus F at point 72.

In FIG. 13 the depression angle of active element 68 is designated $\theta$ and is formed by the perpendicular 70 and line H parallel to line of focus F. The angle formed by the perpendicular 70 and radius $R_{68}$ is designed $\phi$ and $\theta + \phi = 90°$.

Element 67 has a zero depression angle and accordingly its perpendicular 70' is parallel to line of focus F. With $\theta$ equal to zero, the angle $\phi'$ formed by perpendicular 70' and radius line $R_{67}$, is equal to 90°.

Figure 14:
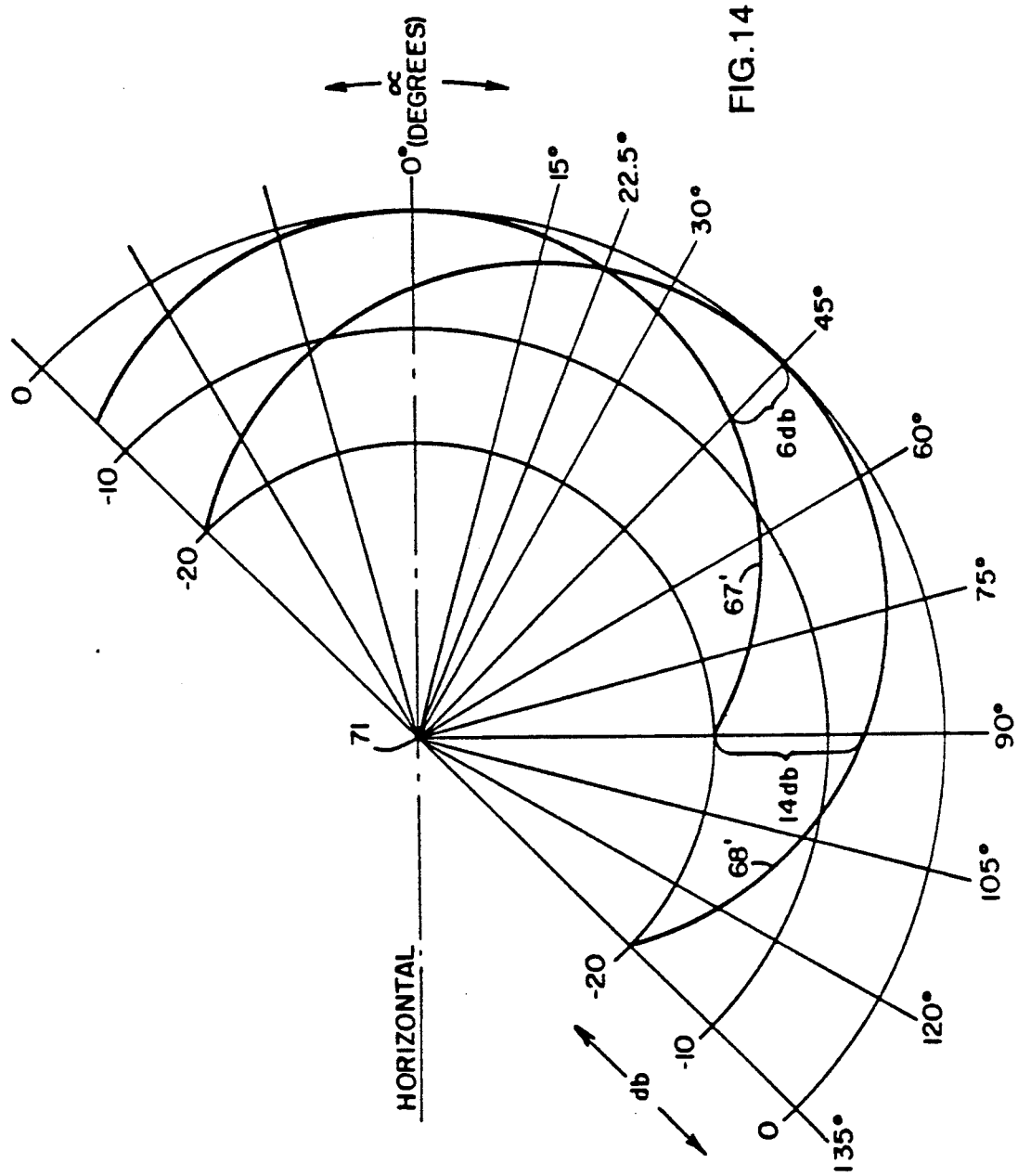
FIG. 14 illustrates the beam patterns, in polar coordinates, of the elements of FIG. 13.

In FIG. 6 there was illustrated a beam pattern plotted in rectangular coordinates wherein the relative pressure was plotted on the vertical scale, and distance on the horizontal scale. Another method of plotting beam patterns is by means of a polar coordinate system wherein concentric circles about an origin represents relative pressure and radii represent angular orientations $\alpha$. In FIG. 14 there is illustrated, in polar coordinates, the beam patterns for elements 67 and 68 both assumed to be positioned at origin 71. In FIG. 13, element 67 is pointed straight out and its beam pattern 67' in FIG. 14 therefor exhibits (transmits or receives) maximum pressure (0 db) at zero degrees. Element 68 is tilted down at an angle $\theta$ and for purposes of illustration let it be assumed that its depression angle $\theta$ is 45°. Accordingly the beam pattern 68' for element 68 has its maximum at 45°.

Assuming that both elements 67 and 68 are transmitting and are of a width equal to $\frac{3}{4}\lambda$, FIG. 14 shows that directly below the transducers, at 90°, the pressure contributed by element 68 is much greater than the pressure contributed by element 67. At the 90° position, curve 67' is approximately 14 db down from curve 68'. At an angle of 45° where the curve 68' is a maximum, curve 67' shows that the pressure contributed by element 67 would be approximately 6 db down from that contributed by element 68. At 22.5° where the two curves intersect, the pressure contributed by element 67 would be equal to the pressure contributed by element 68. Discussion will continue assuming a transmit situation. It should be understood that the above relative values are equally applicable to the elements in a receive situation.

Figure 15:
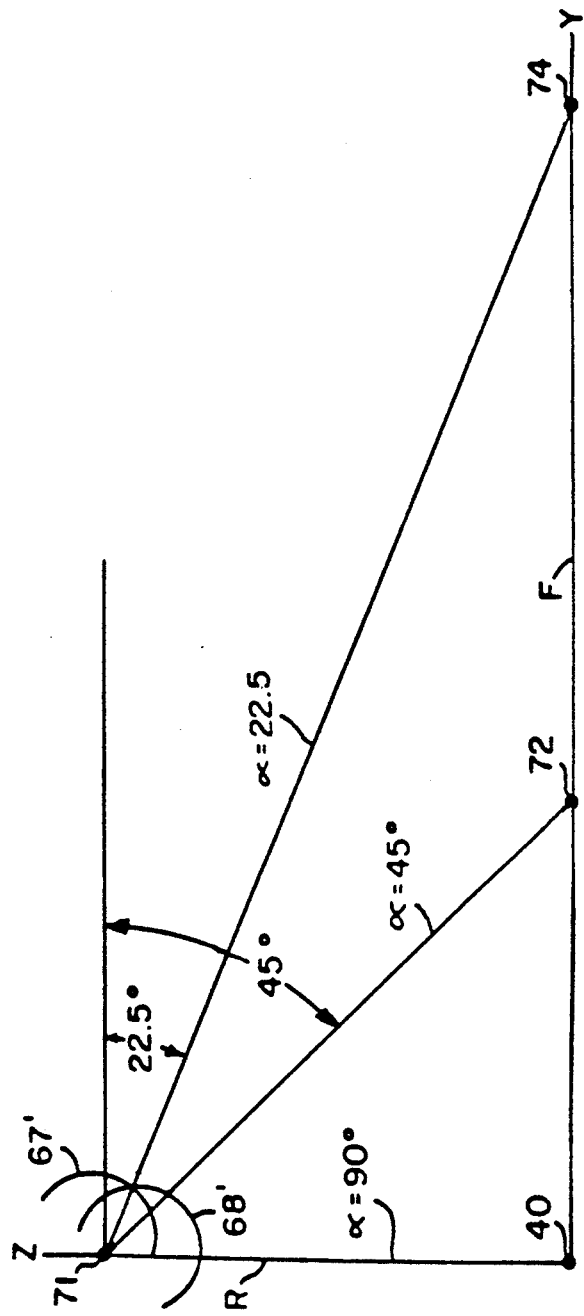
FIG. 15 illustrates the beam patterns of FIG. 14 in a YZ coordinate system.

FIG. 15 is the veiw of the XY plane of FIG. 13 with the curves 67' and 68' superimposed at the general location of the transducer operating at an altitude of R. To a good approximation, at point 40 directly below the transducers ($\alpha = 90°$) the pressure contributed by element 67 (having a zero depression angle) would be 14 db down from the pressure contributed by element 68 tilted at an angle of 45°.

The $\alpha = 45°$ line intersects the line of focus F at point 72 where the pressure contributed by element 67 would be 6 db down from the pressure contributed by element 68.

The $\alpha = 22.5°$ line intersects the line of focus F at point 74 where the pressures contributed by element 67 and 68 would be equal.

Figure 16:
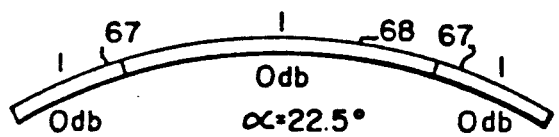
FIGS. 16 and 16a through 18 and 18a serve to illustrate the operation of the present invention.

To better demonstrate the effect of unequal depression angles, a case will be considered wherein a transducer designed for an operating altitude of 20 feet includes 22 one inch elements each element having a width of $\frac{3}{4}\lambda$ with six elements on one end and six elements on the other end of the transducer having a zero depression angle, as element 67 in FIG. 13, while the remaining ten middle elements all have a depression angle of 45°, as element 68 in FIG. 13. FIG. 16 illustrates the resultant transducer array as it would appear from point 74 in FIG. 15. The six elements with zero depression angle made on each end of the transducer are represented by blocks or sections 67. The ten middle elements with a 45° depression angle are represented by block or section 68. With α equal to 22.5°, at point 74 the pressures contributed by elements 67 and 68 are all equal. If the relative pressure contributed by elements 68 is zero db, the pressure contributed by elements 67 is also zero db. Each section of elements therefore all have a relative factor of one. With an operating altitude of R equal to 20 feet, the bottom range to point 74 would be 48.4 feet and the slant range would be 52.4 feet.

Previously, with respect to FIG. 6, there was set forth equation (1) which gave beam width (the distance between −3 db points) in terms of units of distance. Another designation for beam width is in terms of degrees and may be approximated by the relationship:

$$\beta = \frac{51\lambda}{L} \qquad (2)$$

Where $\beta$ is the beam width in degrees $\lambda$ the wavelength and L the effective length of the transducer.

Figure 16A:
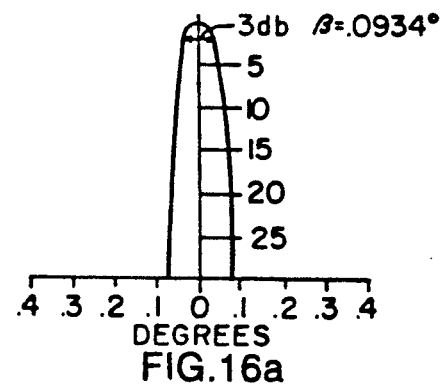

Assuming certain parameters with respect to density propagation, velocity, absorption, and power, and with an operating frequency of 1500 KHz it may be demonstrated that at point 74 the transducer array of FIG. 16 provides a beam pattern (only the main lobe is shown) as illustrated in FIG. 16a. The −3 db beam width $\beta$ is calculated to be 0.0934 degrees. The vertical scale in FIG. 16a represents relative pressure and the horizontal scale is in degrees.

Figure 17:
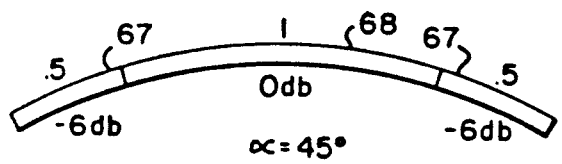
Figure 17A:
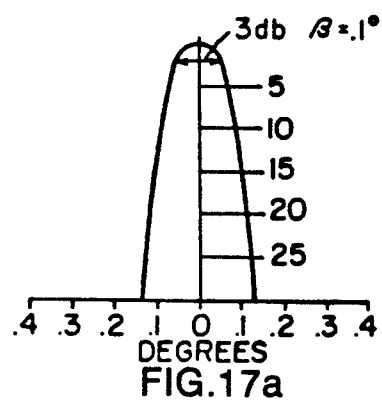

From FIG. 16a $\beta$ is known to be 0.0934, and $\lambda$ is known to be 0.04 inches given the operating frequency of 1500 KHz. The effective length L of the transducer therefore calculates, from eq (2), to be approximately 22 inches. This is equal to the actual length of 22 one inch elements. At point 72 (FIG. 15) the end elements 67 contribute 6 db less than the central elements 68. The transducer from point 72 therefore looks like the transducer illustrated in FIG. 17 wherein the end elements 67 contribute relatively half the pressure as the middle elements 68. With the same parameters as utilized with respect to FIG. 16, the beam pattern at point 72 is as illustrated in FIG. 17a wherein the beam width is calculated to be approximately 0.1 degrees. Substitution in equation (2) yields an effective length L of approximately 20.4 inches.

Figure 18:
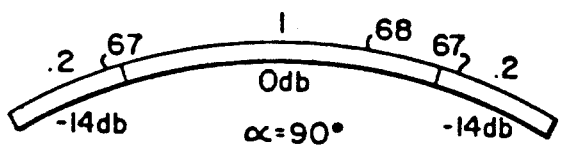
Figure 18A:
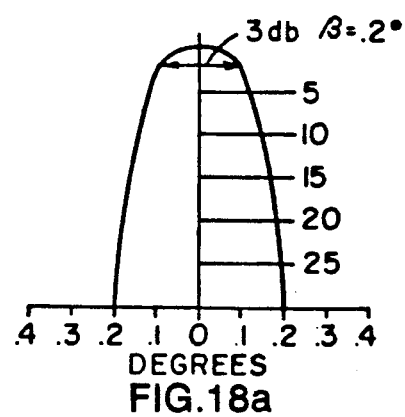

Directly below the transducer at point 40 the pressure contributed by end elements 67 is 14 db down or two tenths that contributed by element 68 and the transducer is illustrated in FIG. 18. Using the same parameters as previously discussed the beam pattern at point 40 for the transducer in FIG. 18 would be as illustrated in FIG. 18a wherein the beam width is calculated to be 0.2 degrees. Substitution in equation (2) yields an effective length L of 10.2 inches.

Accordingly the non-uniform depression angle of the active elements constituting the side looking sonar transducer results in a transducer having an effective length L which decreases as bottom range decreases. As previously stated the depth of focus is approximately proportional to $$\frac{R^2}{L^2}$$

for bottom ranges approximately equal to or less than the magnitude of altitude R, and to $$\frac{R}{L^2}$$

for greater bottom ranges. By providing a transducer whose length L is effectively smaller there results in a significant increase in depth of focus at close in ranges while still maintaining good system resolution. For example, the effective length L of the transducer at point 40 (FIG. 15) is 10.2 inches and at point 74, 22 inches. If one were to use a 10.2 inch transducer with active elements all having the same depression angle, the depth of focus would be increased but the resolution would be degraded. From equation (1) the resolution as measured by the beam width at point 74 with the 10.2 inch transducer would be approximately 2.25 inches whereas with the transducer previously described the depth of focus would be similarly increased while the resolution at point 74 would be approximately 1.13 inches, almost twice the resolution of the 10.2 inch transducer.

Figure 19:
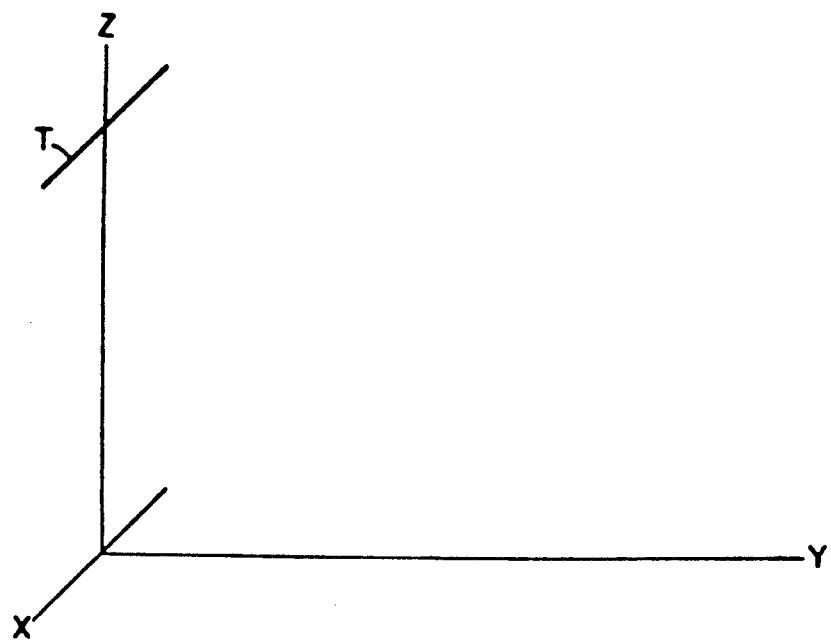
FIG. 19 illustrates a straight line transducer orientation with respect to a target area.

The foregoing principles may also be applied to a straight line transducer such as transducer T in FIG. 19. The elongated transducer T may be similarly made up of a plurality of active elements with the depression angle of the active elements on the ends being less than those in the middle, to insonify a portion of the sea bottom. Since the transducer T is generally parallel to the X axis the acoustic energy radiating therefrom is not focussed along a line of focus.

Figure 20:
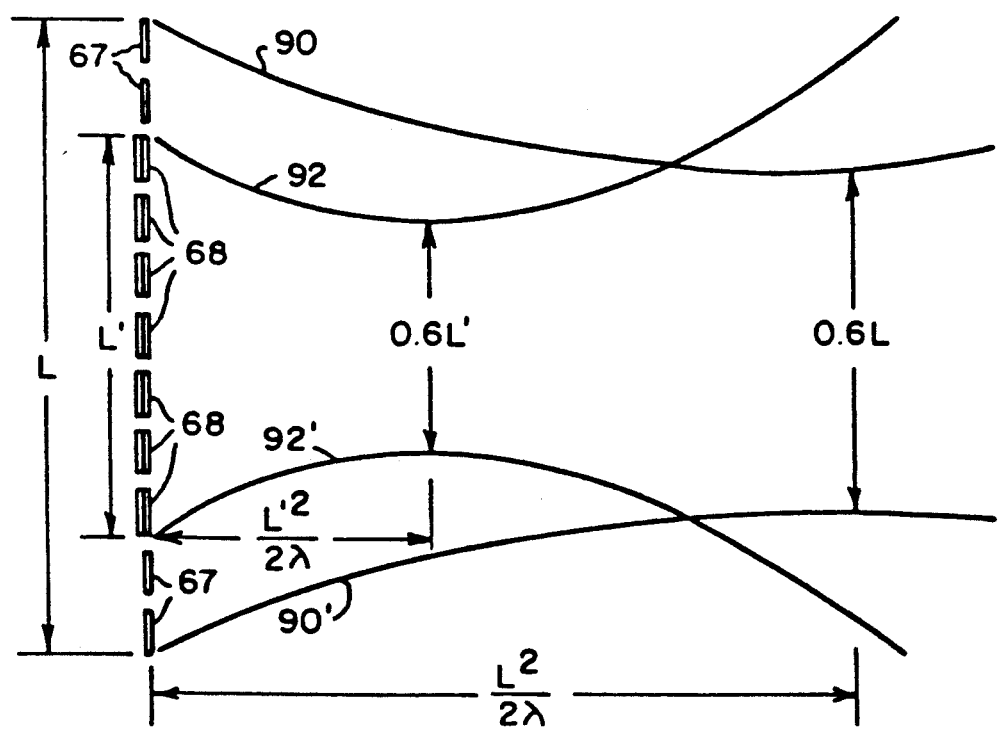
FIG. 20 illustrates another embodiment of the present invention.

A view looking down on the transducer T and the sea bottom is illustrated in FIG. 20. If the transducer has a length L its −3 db beam width in the near field will be that beam width depicted by lines 90, 90'. Starting from the transducer it is seen that the beam width decreases to a minimum value of 0.6 L after which it diverges to form the far field −3 db beam width. The distance of the narrow region from the transducer is approximately given by the value of $$\frac{L^2}{2\lambda}.$$

If it is desired to increase the resolution within the near field then the end elements 67 may be given a lesser depression angle than the central elements 68, exactly as described in FIG. 12, except for the fact that the elements now lie on a straight line. With such an arrangement it will be remembered that the end elements 67 contribute less to the region directly below the transducer, effectively simulating a smaller length transducer. Such simulated smaller length transducer is designated by the length L' and its beam width is depicted by the lines 92, 92'. This latter beam width decreases to a value 0.6 L' at a region closer to the transducer, since L' is smaller than L. By applying the principles discussed herein, therefore, the beam pattern for the transducer for close in ranges will be 92, 92' since elements 67 contribute little energy to the region, whereas for the far field consideration the beam pattern will be described by 90, 90'. The resolution up to distance of $$\frac{L^2}{2\lambda}$$

therefore is increased.

The variable depression angle transducer may be a curved or straight line receiver either one being utilized in conjunction with a curved or straight line transmitter of non-variable depression angle. Conversely the variable depression angle transducer may be the transmitter used in conjunction with a curved or straight line transducer of either variable or non-variable depression angle, with other forms of shading such as utilizing variable width active elements as disclosed in copending application Ser. No. 840,163 filed Jul. 9, 1969, and assigned to the assignee of the present invention.

Although the present invention has been described with a certain degree of particularity, it should be understood that the present disclosure has been made by way of example and that modification in constructional details and variations of the present invention are made possible in the light of the above teachings.

I claim as my invention:

1. Side looking sonar apparatus comprising:
   a) a plurality of transducer active elements each having an active surface of a certain length and width;
   b) said elements being arranged in end-to-end relationship and lying substantially along a line extending between end points;
   c) the depression angle of said elements nearer said end points being less than the depression angle of elements near the center of said line.
2. Apparatus according to claim 1 wherein:
   a) the line is a curved line.
3. Apparatus according to claim 2 wherein:
   a) the line is an arc of a circle of radius R; and
   b) the apparatus is for positioning over a target area at a distance R.
4. Side looking sonar apparatus comprising:
   a) elongated transducer means having an active surface;
   b) said active surface having a depression angle so varied that during operation over a target area said elongated transducer means has a length L with respect to points relatively distant on said target area, and has a simulated length L' with respect to points relatively close on said target area, where $L > L'$.

* * * * *